US006862199B2

(12) United States Patent
Escobar et al.

(10) Patent No.: US 6,862,199 B2
(45) Date of Patent: Mar. 1, 2005

(54) ADAPTIVE CONTROLLER FOR D-STATCOM IN THE STATIONARY REFERENCE FRAME TO COMPENSATE FOR REACTIVE AND HARMONIC DISTORTION UNDER UNBALANCED CONDITIONS

(75) Inventors: Gerardo Escobar, Stoughton, MA (US); Alex M. Stankovic, Boston, MA (US); Paolo Mattavelli, Padua (IT)

(73) Assignee: Northeastern University, Boston, MA (US)

( * ) Notice: Subject to any disclaimer, the term of this patent is extended or adjusted under 35 U.S.C. 154(b) by 16 days.

(21) Appl. No.: 10/467,007

(22) PCT Filed: Jan. 31, 2002

(86) PCT No.: PCT/US02/03167
§ 371 (c)(1),
(2), (4) Date: Aug. 18, 2003

(87) PCT Pub. No.: WO02/062000
PCT Pub. Date: Aug. 8, 2002

(65) Prior Publication Data
US 2004/0071000 A1 Apr. 15, 2004

Related U.S. Application Data

(60) Provisional application No. 60/265,727, filed on Feb. 1, 2001.

(51) Int. Cl.$^7$ .............................. H02H 1/12; G05F 1/70
(52) U.S. Cl. .......................... 363/41; 323/207; 307/105
(58) Field of Search .............................. 363/16, 34, 37, 363/39, 40, 41, 95, 132; 323/222, 205, 207, 210, 209, 248; 307/103, 104, 105, 107

(56) References Cited

U.S. PATENT DOCUMENTS

| 4,780,660 A | * | 10/1988 | Shima et al. ................ 323/207 |
| 4,812,669 A | * | 3/1989 | Takeda et al. ............... 307/105 |
| 5,321,598 A | | 6/1994 | Moran .......................... 363/41 |
| 5,526,252 A | * | 6/1996 | Erdman ........................ 363/41 |
| 5,586,018 A | * | 12/1996 | Aoyama et al. ............... 363/41 |
| 5,642,007 A | | 6/1997 | Gyugyi et al. ............... 307/102 |
| 5,751,138 A | | 5/1998 | Venkata et al. ............. 323/207 |

* cited by examiner

Primary Examiner—Rajnikant B. Patel
(74) Attorney, Agent, or Firm—Weingarten, Schurgin, Gagnebin & Lebovici LLP

(57) ABSTRACT

A controller (130) for compensating reactive power and selected current load harmonics in an unbalanced multi-phase power distribution system. Control current is injected from a multi-phase voltage source inverter (118) into the multi-phase power distribution system as a function of the voltage and current provided by the source inverter 118. The injected current is operative to balance the load seen by the power distribution system including non-linear/distorted and unbalanced loads in each phase. The controller includes an inner loop control processor (216), an outer loop control processor, and an adaptation processor. The adaptation processor (238) is operative to estimate a selected set of predetermined harmonic components in the periodic disturbance which is a function of the unknown system parameters, the source current, the source voltage, and their time derivatives in stationary coordinates.

21 Claims, 4 Drawing Sheets

ADAPTIVE CONTROLLER FOR D-STATCOM IN THE STATIONARY REFERENCE FRAME TO COMPENSATE FOR REACTIVE AND HARMONIC DISTORTION UNDER UNBALANCED CONDITIONS

CROSS REFERENCE TO RELATED APPLICATIONS

This application claims priority under 35 U.S.C. §19(e) to provisional patent application Ser. No. 60/265,727 filed Feb. 1, 2001; the disclosure of which is incorporated by reference.

STATEMENT REGARDING FEDERALLY SPONSORED RESEARCH OR DEVELOPMENT

The work leading to this invention was carried out with United States Government support provided under a grant from the Office of Naval Research, Contract No. N00014-97-1-0704. Therefore, the United States Government has certain rights in this invention.

BACKGROUND OF THE INVENTION

Flexible alternating current (AC) transmission systems (FACTS) that utilize voltage-sourced inverters are increasingly used in power systems because of their improved performance when compared to conventional thyristor based systems. Two types of voltage sourced inverter that are used to provide compensation for non-linear and distorting loads are a Static Synchronous Compensator (STATCOM) and a Distribution STATCOM (D-STATCOM). In particular, the STATCOM and D-STATCOM systems are used at the power distribution level to compensate for harmonics that are introduced into the power distribution system due to the non-linear distorting loads.

Conventional STATCOM and D-STATCOM systems typically use active power filters to filter these harmonics. However, these active power filters reduce the power system performance due to the limited control bandwidth, delays in any digital implementation, and interactions with the non-linear distorting loads. In addition, in order to reduce the complexity of the D-STATCOM the pulse width modulation (PWM) switching frequency of a conventional D-STATCOM system may only be a few kilohertz. Thus, the bandwidth of the various control loops within the D-STATCOM is limited and this limited bandwidth reduces the ability of the D-STATCOM system to track and compensate for unwanted disturbances caused by the non-linear/distorting loads.

Therefore, it would be advantageous to provide a STATCOM and D-STATCOM system that uses a conventionally low PWM switching frequency and that is able to track and compensate for at least some disturbance harmonics generated by a non-linear distorting load.

BRIEF SUMMARY OF THE INVENTION

A controller for compensating reactive power and selected load current harmonics in an unbalanced multi-phase power distribution system by controlling the injection of current from a multi-phase voltage source inverter (VSI) into the multi-phase power distribution system. The injected current is determined such that the injected current is operative to balance the load seen by the power distribution system. In particular, the controller determines the injected current to compensate for the harmonic distortion in the source current, provided by the multi-phase power distribution system, caused by non-linear/distorted and unbalanced loads in each phase. The controller receives as inputs measurements of the source voltage and current, the output voltage across an output capacitor on the VSI, and a reference voltage. The controller includes an inner loop control processor, an outer loop control processor, and an adaptation processor. The adaptation processor is operative to estimate a selected set of predetermined harmonic components of the periodic disturbance which is a function of the unknown system parameters, the source current, the source voltage, and their time derivatives in stationary coordinates. The outer loop processor is operative to provide a source reference current as a function of the reference voltage, the output voltage, and the source voltage. The inner loop processor is operative to provide a first control vector as a function of the source reference current and the estimated plurality of harmonic components. The first control vector is combined with the source voltage and the output voltage to form an output control vector that is provided to the VSI. All calculations in the controller are carried in stationary: $\alpha$-$\beta$ coordinates so that all measurements of the multi-phase source voltage and source current must be converted into stationary coordinates.

In one embodiment, a controller is disclosed for providing a control vector to a three-phase VSI for controlling the VSI output voltage and current. The VSI has an output capacitor coupled across the voltage output, and each phase of the VSI is coupled to a corresponding phase of a three-phase power distribution system via a corresponding filter inductor. The three phase power distribution system provides a source voltage and a source current for each phase to a corresponding non-linear/distorting three phase load.

The controller includes a source current module that is operative to provide a signal indicative of the value of the source current in each phase and a source voltage module that is operative to provide a signal indicative of the value the source voltage in each phase. The controller further includes a three-phase to stationary coordinate converter that is operative to convert the three-phase source current value into a stationary source current value and to convert the three-phase source voltage value into source voltage value. The controller also includes an output voltage module that is operative to determine the output voltage across the VSI output capacitor and to provide a signal indicative of the output voltage. The controller also receives a reference voltage as well.

The control vector processor includes an outer loop controller receiving the reference voltage, the output voltage, and the source voltage. The outer loop controller is operative to provide an output signal that is a source reference current that is a function of the difference of the square of the reference voltage and the square of the output voltage. The control vector processor also includes an adaptation processor that is coupled to the three phase to stationary coordinate converter module and receives both the source current and the source voltage in stationary coordinates therefrom. The adaptation processor is operative to estimate a selected set of predetermined harmonic components of the periodic disturbance which is a function of the unknown system parameters, the source current, the source voltage, and their time derivatives and to provide these plurality of estimated harmonic components in stationary coordinates. The control vector processor further includes an inner control loop controller that receives the source voltage, and the source current from the coordinate converter module, and receives the plurality of estimated harmonic components from the adaptation processor. The inner loop processor also receives the source reference current from the outer loop controller and. The inner loop is operative to provide a first control vector that is a function of the source current, the source reference current, and the source voltage in stationary coordinates. The control vector processor provides an output control vector that is a function of the first control vector and the output voltage, wherein the output control vector is provided to the VSI.

Other forms, features, and aspects of the above-described methods and system are described in the detailed description that follows.

BRIEF DESCRIPTION OF THE SEVERAL VIEWS OF THE DRAWING

The invention will be more fully understood from the following detailed description taken in conjunction with the accompanying drawings in which.

DETAILED DESCRIPTION OF THE INVENTION

Figure 1:
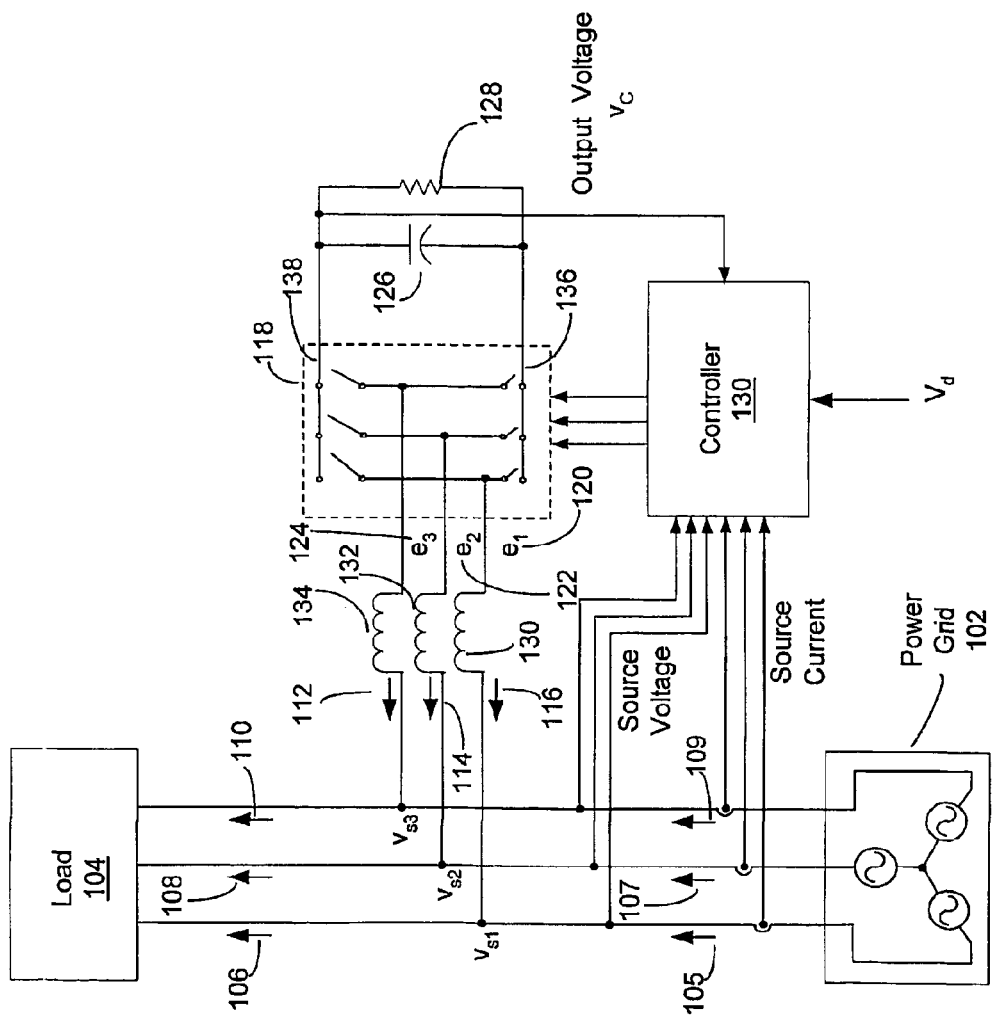
FIG. 1 is a block diagram of a voltage source inverter and a controller for compensating reactive power and selected current harmonics due to an unbalanced three phase load coupled to an unbalanced three phase power distribution system.

FIG. 1 depicts a controller and a three-phase three-wire voltage source inverter configured as a distribution static synchronous compensator (D-Statcom). The system includes a power grid 102 that provides source currents 105, 107, and 109 corresponding to the first phase, second phase, and third phase respectively, along with source voltages $V_1$, $V_2$, and $V_3$ for each phase respectively. The three phase load 104 includes independent non-linear distorting loads (not shown), wherein each phase has a corresponding non-linear distorting load. Since each of the independent loads does not have to be equal to any other load, the load currents 106, 108, and 110 are unbalanced. Additionally, the load currents 106, 108, and 110, can have unique harmonics disturbance signals thereon resulting from the individual load attached to the corresponding phase, with the only restriction that the sum of all three currents equals zero.

A three phase voltage source inverter 118 that is capable of providing a three phase voltage and current output, wherein each phase can provide an output voltage and current to each phase of the power grid 102 that are uncorrelated to the other phases. Each phase of the voltage source inverter 118 is coupled to a corresponding phase of the power distribution system 102 via a corresponding filter inductor. In particular, the three-phase voltage source inverter 118 provides inverter voltages 120, 122, and 124 and corresponding inverter currents 116, 114, and 112 to the power grid 102 via filter inductors 130, 132, and 134 respectively. The three phase voltage source inverter 118 further includes output capacitor 126 and output resistor 128 connected across the rails of the voltage source inverter 136 and 138.

A controller 130 receives source current and source voltage measurements from the power grid 102, a reference voltage $V_D$, and a measurement of the output voltage $V_C$ of the VSI taken across the output capacitor. The controller 130 is operative to provide a control vector to the voltage source inverter 118 that is a function of the measured source currents and source voltages, the reference voltage $V_D$, and the output voltage $V_C$. The objective of the controller 130 is to provide a control vector to the voltage source inverter 118 to force the currents on each phase of the power grid 102 to be proportional to the respective line voltage V1, V2, and V3. This control objective is accomplished by charging the output capacitor 228 to a desired voltage and maintaining the output capacitor at that voltage during normal operation. Specifically, the control vector is determined to ensure that the VSI injects compensating currents 112, 114, and 116 into the corresponding phase of the power distribution grid 102 that compensate for the reactive power and selected current harmonics due to unbalanced and non-linear distorting loads.

Figure 2:
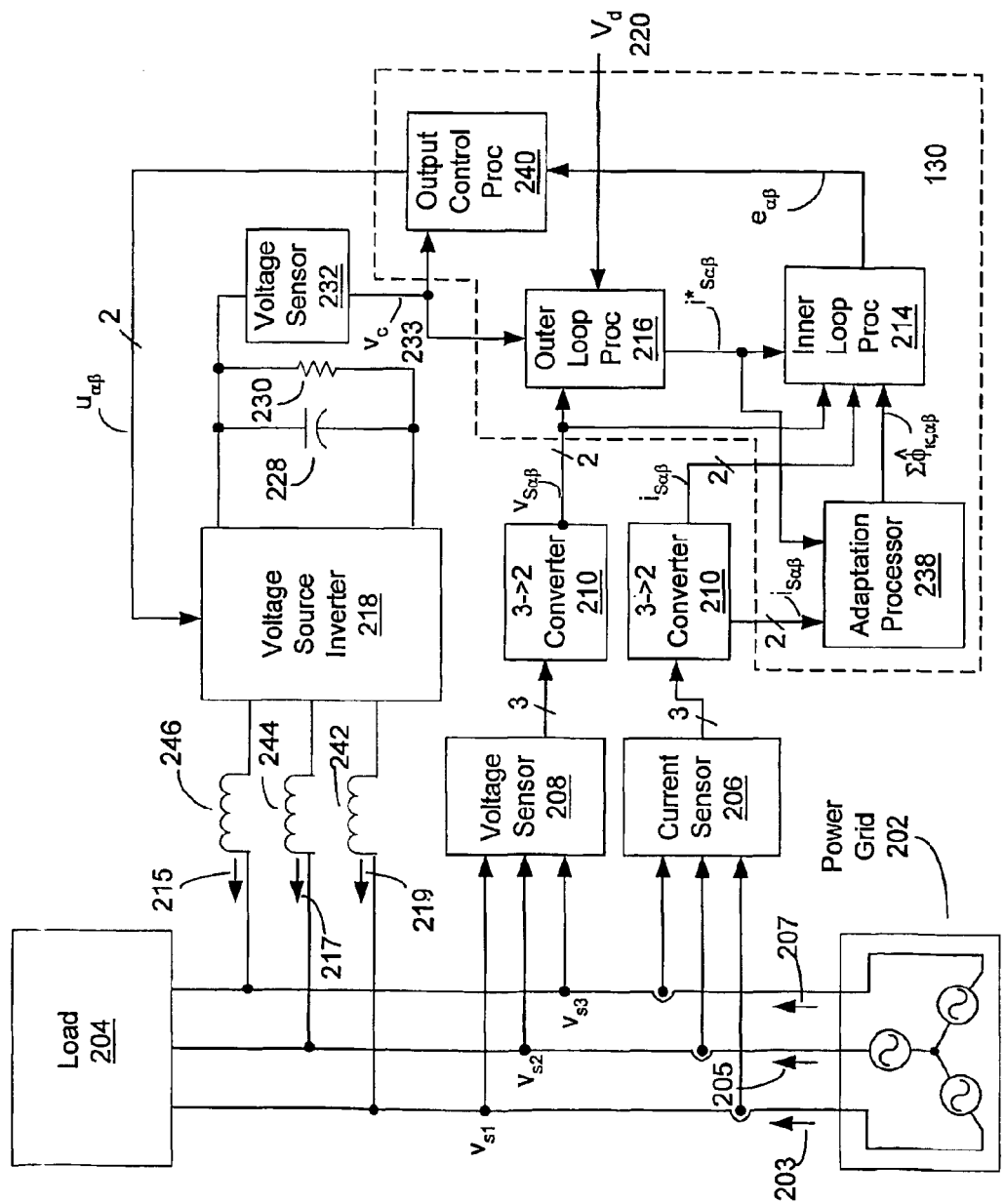
FIG. 2 is more detailed block diagram of the controller and voltage source inverter depicted in FIG. 1.

FIG. 2 depicts a more detailed block diagram of a controller and a three-phase three-wire VSI configured as a D-Statcom. As depicted in FIG. 2 a three phase power grid 202 provides power to a load 204 as described above with reference to FIG. 1. A current sensor 206 senses the source currents in the first, second, and third phase, currents 203, 205, and 207 respectively, and provides a corresponding source current measurement vector to a stationary coordinate converter ("3->2 converter") module 210. Similarly, a voltage sensor 208 senses the source voltages in the first, second, and third phases, $V_1$, $V_2$, and $V_3$ respectively, and provides a corresponding source voltage measurement vector to the 3->2 converter 212. The 3->2 converter modules 210 and 212 provide a source current vector, $i_{S\alpha\beta}$ and a source voltage vector, $v_{S\alpha\beta}$ as outputs, respectively. A voltage sensor 232 senses and measures the output voltage $V_C$ across the output capacitor 228 and provides the measured value of $V_C$ as an output. A reference or desired voltage $V_D$ 220 is also provided. The reference voltage $V_D$ is determined according to the particular system requirements.

Alternatively, one or more estimators may be constructed to estimate the three current measurements, the three voltage measurements, or both and to provide these estimated values to the respective first and second three-phase to stationary coordinate converters 210 and 212. Additionally, an estimator may be constructed to estimate the output voltage 233.

Control vector processor 130 includes four modules: an outer loop control processor 216, an inner loop control processor 214, an adaptation processor 238, and an output control processor 240. As will be explained in more detail below, the adaptation processor 238 is operative to provide estimates of one or more predetermined harmonic components of the periodic disturbance which is a function of the unknown system parameters, the source current, the source voltage, and their time derivatives in stationary coordinates. The outer loop processor 216 receives the reference voltage $v_D$ 240, the output voltage $v_C$ and the source voltage $v_{S\alpha\beta}$. As will be explained in more detail below, the outer loop processor 216 combines these inputs to provide an output that is the source reference current $i^*_{S\alpha\beta}$. The inner loop processor 214 receives the harmonic components from the adaptation processor 238 and further receives source current $i_{S\alpha\beta}$ and the source voltage $v_{S\alpha\beta}$ from the 3->2 coordinate converter 210 and also receives the source reference current $i^*_{S\alpha\beta}$ from the outer loop processor 214. As will be explained in more detail below, the inner loop processor 214 combines these inputs to form a first control vector $e_{\alpha\beta}$. The first control vector $e_{\alpha\beta}$ is provided to the output control vector module 240 along with the output voltage $v_C$. The output control vector module 240 forms an output control vector $u_{\alpha\beta}$ that is a function of the output voltage $v_C$ and the first control vector $e_{S\alpha\beta}$. The output control vector processor 240 then provides the output control vector $u_{\alpha\beta}$ to the voltage source inverter 218. The voltage source inverter 218 under the control of output control vector $u_{\alpha\beta}$ injects first, second, and third currents, current 219, 217, and 215 respectively, into the corresponding phase of power grid 202 via filter inductor 242, 244 and 246 respectively.

The system depicted in FIG. 2 can be modeled in terms of conventional stationary $\alpha\beta$ coordinates as:

$$L\frac{d}{dt}i_{S\alpha\beta}(t) = L\frac{d}{dt}i_{L\alpha\beta}(t) - e_{\alpha\beta} + v_{S\alpha\beta}(t) \quad (1)$$

$$C\frac{d}{dt}\left(\frac{v_C^2}{2}\right) = e_{\alpha\beta}^T(i_{S\alpha\beta} - i_{L\alpha\beta}) - \left(\frac{v_C^2}{R_L}\right) \quad (2)$$

where $i_{S\alpha\beta}$ (t) are the compensating currents, $\in \Re^2$;
$i_{L\alpha\beta}$ (t) are the load currents, $\in \Re^2$;
$v_{S\alpha\beta}$ (t) are the source voltages, $\in \Re^2$;
L is the filter inductance that is the same for each phase;
C is the output capacitor;
$e_{\alpha\beta}$ is the control input; and
$R_L$ is the resistive element modeling switching and other losses and also includes an optional load resistance.

The control input is defined as $$e_{\alpha\beta} \equiv \frac{v_C u_{\alpha\beta}}{2},$$

making the assumption that $v_C$ is bounded away from zero and used the relationship $i_{S\alpha\beta}=i_{L\alpha\beta}+i_{\alpha\beta}$. Utilizing the source currents, $i_{S\alpha\beta}$ instead of the shunt currents $i_{\alpha\beta}$ reduces the number of current sensors required so that only the source current is needed to evaluate the control action. The transformation between three-phase space and the stationary coordinate space that is used in the 3->2 converter module 210 is given by the transformation $x_{\alpha\beta}$=Ax:

$$\begin{bmatrix} x_\alpha \\ x_\beta \end{bmatrix} = \frac{2}{\sqrt{3}}\begin{bmatrix} 1 & \frac{-1}{2} & \frac{-1}{2} \\ 0 & \frac{\sqrt{3}}{2} & \frac{-\sqrt{3}}{2} \end{bmatrix}\begin{bmatrix} x_1 \\ x_2 \\ x_3 \end{bmatrix} \quad (3)$$

that has an inverse transformation $A^{-1}=(\frac{1}{2})A^T$.

For the design of the controller, the averaged variant of the model described above will be used. Assuming that the switching control sequence uses a sufficiently high switching frequency, the control vector $\delta$ can be replaced by the corresponding duty ratio $u=[u_1,u_2,u_3]^T$. Under these conditions, the averaged model can be expressed as:

$$L\frac{d}{dt}i(t) = -ri(t) - \frac{v_C(t)}{2}Bu(t) + v_s \quad (4)$$

$$C\frac{d}{dt}v_C(t) = \frac{u(t)^T i(t)}{2} - \frac{v_C(t)}{R_L} \quad (5)$$

Since the injected voltage term, $v_c u$, will generate harmonics other than those associates with each factor, unless the control term u contains a term cancelling $v_c$. Accordingly, the entire injected voltage is used as a control input variable with the transformation:

$$e = \frac{v_C u}{2}$$

that leads to the system model:

$$L\frac{d}{dt}i(t) = -ri(t) - Be(t) + v_s(t) \quad (6)$$

$$Cv_C\frac{d}{dt}v_C(t) = e(t)^T i(t) - \frac{v_C^2(t)}{R_L}. \quad (7)$$

which after the 3->2 transformation yields the model (1)–(2).

The control objective is for the voltage source inverter 218 to inject the necessary currents into the power distribution system 202 so that the source terminals all observe the same apparent resistance in all phases and at all selected frequencies. Accordingly, for properly generated and injected currents the power grid 202 will be supplying current to a balanced load. Thus, the current provided by the source should track a reference that is proportional to the voltages generated by the source, that is $$i_{S\alpha\beta} \to \tilde{i}_{S\alpha\beta} = gv_{S\alpha\beta} \quad (8)$$

where g is a scalar quantity that represents the unknown apparent conductance of each phase. Although ideally the current tracking expressed in equation (8) should be performed over all frequencies, the limited bandwidth of the source voltage inverter implies that equation (8) can only be solved for a plurality of predetermined harmonic frequencies. As more accurate current tracking is needed, the number of predetermined harmonic frequencies must be increased.

The load current $i_{L\alpha\beta}$ and the source voltage $v_{S\alpha\beta}$ are independently unbalanced periodic signals that contain higher harmonic frequencies of the fundamental frequency denoted by $\omega$:

$$v_{S\alpha\beta} = \sum_{k \in H}(e^{\mathcal{J}k\omega t}V_{s,k}^P + e^{-\mathcal{J}k\omega t}V_{s,k}^N) \quad (9)$$

$$i_{S\alpha\beta} = \sum_{k \in H}(e^{\mathcal{J}k\omega t}I_{L,k}^P + e^{-\mathcal{J}k\omega t}I_{L,k}^N) \quad (10)$$

where $$e^{\mathcal{J}k\omega t} = \begin{bmatrix} \cos(\omega k t) & -\sin(\omega k t) \\ \sin(\omega k t) & \cos(\omega k t) \end{bmatrix}, e^{-\mathcal{J}k\omega t} = (e^{\mathcal{J}k\omega t})^T, \mathcal{J} = \begin{bmatrix} 0 & -1 \\ 1 & 0 \end{bmatrix} \quad (11)$$

Vectors $I^P_{L,k}$, $I^n_{L,k}$ are two dimensional vectors that represent the $k^{th}$ harmonic coefficients for the positive and negative sequence representing the load current. Similarly, vectors $V^P_{S,k}$, $V^N_{S,k}$ are two dimensional vectors that represent the $k^{th}$ harmonic coefficients for the positive and negative sequence representing the source voltage. In both instances, H={1,2,3, . . . } is the set of predetermined harmonic indices corresponding to the selected harmonics. Since all of the load current and source voltage harmonic coefficients are considered to be unknown or slowly varying signals the time derivatives can be explicitly provided as:

$$\frac{dv_{S\alpha\beta}}{dt} = \mathcal{J}\omega \sum_{k \in H} k(e^{\mathcal{J}k\omega t}V_{S,k}^P - e^{-\mathcal{J}\omega t}V_{S,k}^n) \qquad (12)$$

$$\frac{di_{L\alpha\beta}}{dt} = \mathcal{J}\omega \sum_{k \in H} k(e^{\mathcal{J}k\omega t}I_{S,k}^P - e^{-\mathcal{J}\omega t}I_{S,k}^n). \qquad (13)$$

In the design of the controller, the current dynamics represented by equation (1) respond at a faster rate when compared to the voltage dynamics in equation (2). Accordingly, the controller can be conceptualized and designed as a two stage controller comprising an inner (current) loop controller and an outer (voltage) loop controller.

The goal of the inner loop controller is to have the source current $i_{S\alpha\beta}$ track toward a reference current $i^*_{S\alpha\beta}$. In the known parameters case the controller, which is a dissipative controller and provides for asymptotic tracking of the source current to the reference current, is given by:

$$e_{\alpha\beta} = -L\frac{di^*_{S\alpha\beta}}{dt} + L\frac{di_{L\alpha\beta}}{dt} + v_{S\alpha\beta} + k_1 \tilde{i}_{S\alpha\beta} \qquad (14)$$

where $\tilde{i}_{S\alpha\beta} = i_{S\alpha\beta} - i^*_{S\alpha\beta}$ and $k_1$ is a positive definite matrix. The time derivative for the source current can be determined using equations (8) and (9) such that the controller in equation (14) becomes:

$$e_{\alpha\beta} = -\sum_{k \in H}(e^{\mathcal{J}k\omega t}\Phi_k^P + e^{-\mathcal{J}k\omega t}\Phi_k^n) + v_{S\alpha\beta} + k_1 \tilde{i}_{S\alpha\beta} \qquad (15)$$

where to place the harmonic coefficients together $\Phi^p$ and $\Phi^n$ are defined as:

$$\Phi_k^p \triangleq L(\dot{g}V_{S,k}^P + g\mathcal{J}k\omega V_{S,k}^P - \mathcal{J}k\omega I_{L,k}^P) \qquad (16)$$

$$\Phi_k^n \triangleq L(-\dot{g}V_{S,k}^n + g\mathcal{J}k\omega V_{S,k}^n + \mathcal{J}k\omega I_{L,k}^p) \qquad (17)$$

where $k \in H$, and thus, the first term on the right hand side of (15) is a periodic disturbance which is a function of the unknown system parameters, the source current, the source voltage, and their time derivatives in stationary coordinates.

Assuming that g and $\dot{g}$ converge slowly toward a constant value, then $\Phi^p$ and $\Phi^n$ can be assumed approximately constant as well. Assuming that the inductance L is constant, and that all the harmonic coefficients are unknown, the controller provided in equation (15) can be re-formulated and consider instead the the following controller which includes an estimation for the periodic disturbance:

$$e_{\alpha\beta} = -\sum_{k \in H}(e^{\mathcal{J}k\omega t}\hat{\Phi}_k^p + e^{-\mathcal{J}k\omega t}\hat{\Phi}_k^n) + v_{S\alpha\beta} + k_1 \tilde{i}_{S\alpha\beta}$$

which in closed loop with the subsystem from equation (1) and yields the following error model:

$$L\frac{di_{S\alpha\beta}}{dt} = \sum_{k \in H}(e^{\mathcal{J}\omega kt}\tilde{\Phi}_k^p + e^{-\mathcal{J}\omega kt}\tilde{\Phi}_k^n) - K_1 \tilde{i}_{S\alpha\beta} \qquad (18)$$

where $\tilde{\Phi}_k^P = \hat{\Phi}_k^P - \Phi_k^P$ and $\tilde{\Phi}_k^n = \hat{\Phi}_k^n - \Phi_k^n$ and $(\hat{\cdot})$ is used to represent an estimate of the value in the parenthesis. The estimates can be determined using the following adaptation equations where $k \in H$:

$$\dot{\hat{\Phi}}_k^p = -\gamma_k e^{-\mathcal{J}\omega kt}\tilde{i}_{S\alpha\beta} \qquad (19)$$

$$\dot{\hat{\Phi}}_k^n = -\gamma_k e^{\mathcal{J}\omega kt}\tilde{i}_{S\alpha\beta} \qquad (20)$$

To avoid the rotations of the form $e^{\pm \Im \omega kt}$ appearing in the controller, the following transformations are used:

$$\hat{\phi}_k^P = -e^{-\mathcal{J}\omega kt}\hat{\Phi}_k^P \qquad (21)$$

$$\hat{\phi}_k^n = -e^{-\mathcal{J}\omega kt}\hat{\Phi}_k^n$$

The inner loop controller can then be expressed as:

$$e_{\alpha\beta} = \sum_{k \in H}(\hat{\phi}_k^P + \hat{\phi}_k^n) + v_{S\alpha\beta} + K_1 \tilde{i}_{S\alpha\beta} \qquad (22)$$

with the adaptive laws transformed to:

$$\dot{\hat{\phi}}_k^P = \gamma_k \tilde{i}_{S\alpha\beta} - \mathcal{J}k\omega \hat{\phi}_k^P \qquad (23)$$

$$\dot{\hat{\phi}}_k^n = \gamma_k \tilde{i}_{S\alpha\beta} + \mathcal{J}k\omega \hat{\phi}_k^n \qquad (24)$$

where $k \in H$. Writing the dynamical part of the controller in the form of transfer functions, yields the controller in the form having a second order bandpass filter centered at the selected frequency for each predetermined harmonic. The controller has the form of:

$$e_{\alpha\beta} = \sum_{k \in H}\frac{2\gamma_k s}{s^2 + k^2 \omega^2}\tilde{i}_{S\alpha\beta} + v_{S\alpha\beta} + K_1 \tilde{i}_{S\alpha\beta} \qquad (25)$$

where $\hat{\phi}_{k,\alpha\beta} \equiv (\hat{\phi}_k^P + \hat{\phi}_k^n)$ and $$\hat{\phi}_{k,\alpha\beta} = \frac{2\gamma_k s}{s^2 + k^2 \omega^2}\tilde{i}_{S\alpha\beta},$$

where s is the Laplace variable and $k \in H$.

In the slower outer loop controller, the control objective is to ensure that the DC components of the output voltage $v_C$ is driven to a predefined constant reference voltage $V_D$. As discussed above, the inner loop controller contains faster dynamics than the outer loop controller, thus after a short period of time, the source current $i_{S\alpha\beta}$ will approximately equal the reference source current $i^*_{S\alpha\beta}$ and the estimate $\hat{\phi}_{k,\alpha\beta} = \phi_{k,\alpha\beta}$. Accordingly, the voltage/capacitor dynamics are given by:

$$C\frac{d}{dt}\left(\frac{v_C^2}{2}\right) = -i_{L\alpha\beta}^T \sum_{k \in H}\phi_{k,\alpha\beta} + g\left(v_{S\alpha\beta}^T v_{S\alpha\beta} + v_{S\alpha\beta}^T \sum_{k \in H}\phi_{k,\alpha\beta}\right) - \frac{v_C^2}{R_L}$$

A controller using a lead-lag filter is used to provide the necessary control signal in the form of:

$$g = \frac{K_i s + b(K_i - K_p)}{s(s+b)}\left(\frac{\tilde{v}_C^2}{2}\right)$$

The controller yields a linear time invariant (LTI) system, once the dc component of the capacitor dynamics above is extracted, and in which stability may be shown to exist for the condition that $K_i > K_p$.

Figure 3:
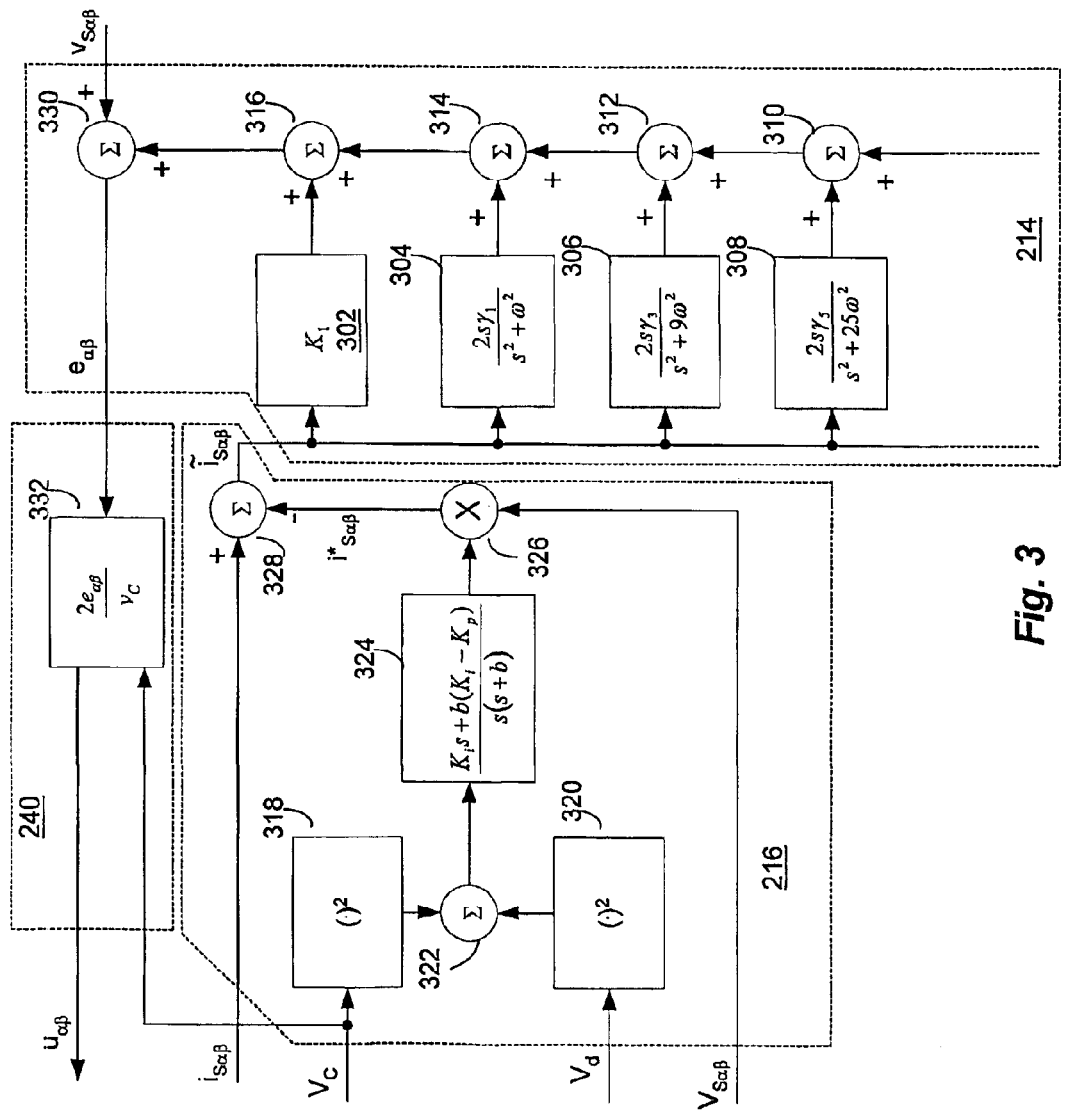
FIG. 3 is a block diagram depicting the internal dynamics of the controller depicted in FIGS. 1 and 2.

This structure is depicted in FIG. 3. In particular, FIG. 3 depicts the structure of the controller 130 and in particular of the inner loop control processor 214, the output loop control processor 216 and the output control vector processor 240. In particular, inner loop control processor 214 receives the source reference current $i^*_{s\alpha\beta}$ from the outer loop control processor 216 subtracts it from the measured current $i_{s\alpha\beta}$ to obtain the error current, and multiplies the error current by a predetermined constant $K_1$. The error current is also provided to a plurality of harmonic filters 304, 306, and 308. Other harmonic filters may be added depending on the system requirements, as such, three harmonic filters are provided for exemplary purposes only and are not meant to be limiting. Each one of the plurality of harmonic filters 304–308 provide a filtered control signal component as an output, wherein the resonant frequency of each of the filters is given by $k\omega$, where k is the $k^{th}$ pre-selected harmonic, wherein $k \in H$ and $H\{1,2,3,\ldots\}$. A filtered control signal is obtained by summing the plurality of k filtered control signal component from each of the harmonic filters 302–308, the proportional gain term from module 302 in summing modules 310–316 and the source voltage $V_{s\alpha\beta}$ in summing module 330. The source voltage $V_{s\alpha\beta}$ is added to the filtered control vector in summing module 330 to form the first control vector $e_{s\alpha\beta}$.

The outer loop control processor 216 is depicted in FIG. 3 and receives the output voltage $v_C$, the reference voltage $V_d$ and the source current and source voltage measurements. The output voltage $v_C$ is squared in module 318 and the reference voltage $V_d$ is squared in module 320. The difference between the squared values is provided by difference module 322 and provided to lead-lag filter 324. The filtered output from the lag-lead filter 324 is multiplied by the source voltage in module 326 to form the source reference current $i^*_{s\alpha\beta}$.

The output control vector processor 240 receives the first control vector $e_{\alpha\beta}$ from the inner loop control processor 214. The output control vector $u_{\alpha\beta}$ is formed by multiplying the first control vector by a predetermined factor, which in the illustrated embodiment is 2, and dividing the result by the output voltage $v_C$ in module 332.

The various variables can be set to predetermined constants based on the particular system dynamics and constraints. In one embodiment, the coefficient $K_1$ is set $k_{ip}*I_2$ where $k_{ip}$ is a conventional proportional gain constant of a PI controller and $I_2$ is the 2×2 identity matrix. Accordingly, $k_{ip}$ can be set equal to $2\pi f_{ic}*L$ where $f_{ic}$ is the desired loop bandwidth that is typically $\frac{1}{10}$–$\frac{1}{14}$ of the sampling frequency. The values for the various values of $\gamma_k$ can be set as $\gamma_k = 2.2/T_{kr}$ where $T_{kr}$ is the desired response time for each harmonic component, as evaluated between 10% and 90% of a step response of the amplitude of the corresponding sinusoidal perturbation.

The outer loop control parameters are determined using conventional control techniques. In particular, the outer loop parameters are driven by the desired voltage loop bandwidth and the desired phase margin. However, due to the ripple on the DC voltage at twice the supply frequency during unbalanced conditions the voltage loop bandwidth should be limited to approximately 10–20 Hz to avoid possible amplification of the second harmonic in the line current reference.

Figure 4:
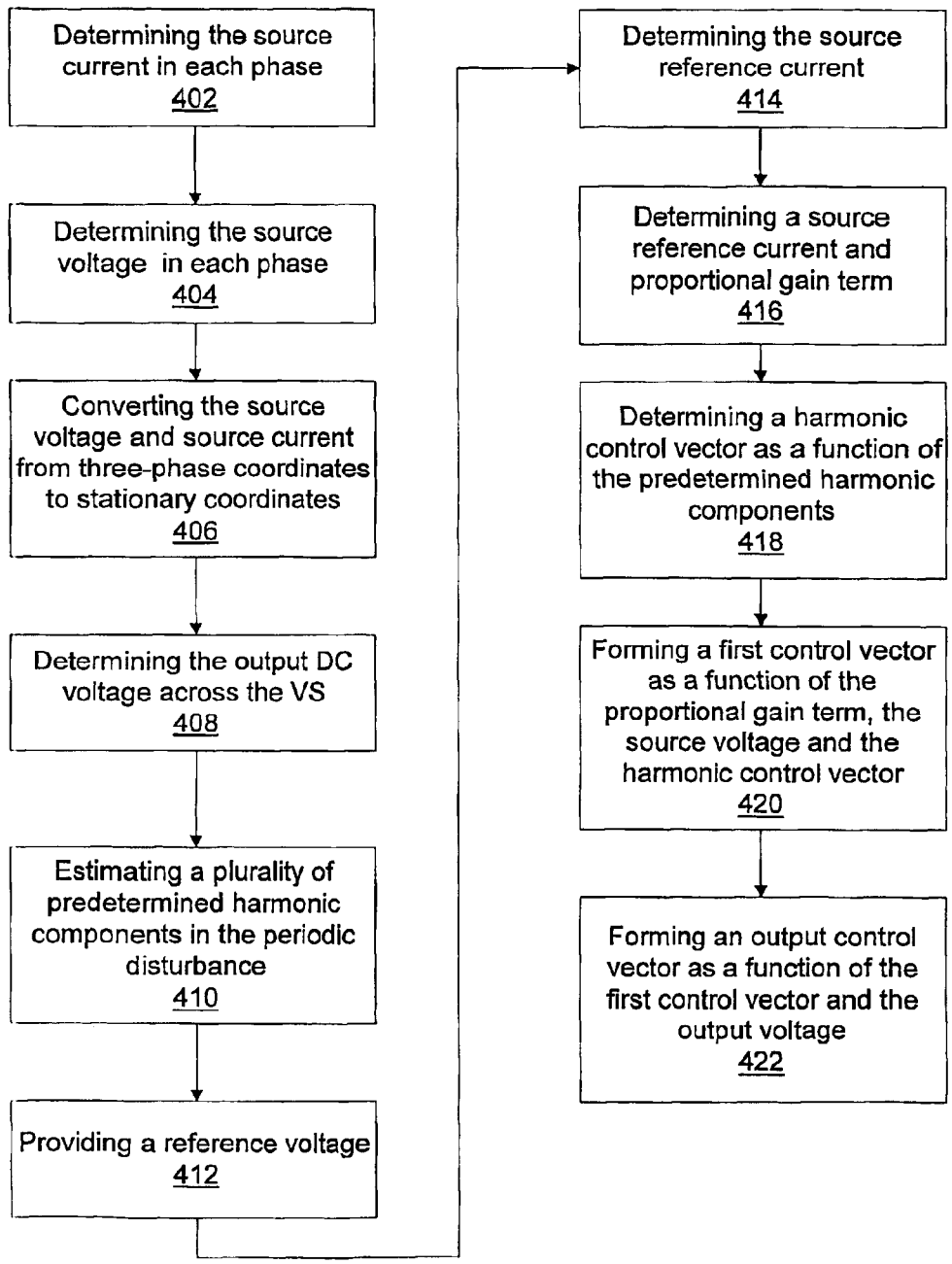
FIG. 4 is a flow chart depicting a method of controlling a voltage source inverter consistent with the present invention.

FIG. 4 depicts a method for controlling a VSI consistent with the description of the system herein. The source current and source voltages are determined and converted into stationary coordinates as depicted in steps 402, 404, and 406. The output voltage of the output capacitor connected across the VSI, which is described above, is determined, as depicted in step 408. An estimation of a plurality of predetermined harmonic components of the periodic disturbance, which is a function of the unknown system parameters, the source current, the source voltage, and their time derivatives in stationary coordinates, is made, as depicted in step 410. A reference voltage is provided, as depicted in step 412. The source reference current is determined as a function of the reference voltage, the VSI output capacitor voltage, and the source voltage as depicted in step 414. A proportional gain term for the source reference current is determined, as depicted in step 416. A harmonic control vector is determined as a function of the error current and the estimated harmonic components, as depicted in step 418. A first control vector is determined as a function of the harmonic control vector, the proportional gain term, and the source voltage, as depicted in step 420. The output control vector is determined as a function of the first control vector and the output voltage, as depicted in step 422.

Those of ordinary skill in the art should further appreciate that variations to and modification of the above-described methods and apparatus for controlling a VSI can be made. In particular, some measurements can be replaced with their estimates, as in the case of current estimates from measured DC-link current and from known switching pattern. Accordingly, the invention should be viewed as limited solely by the scope and spirit of the appended claims.

What is claimed is:

1. A controller providing a control vector to a three-phase voltage source inverter, each phase of the voltage source inverter having an output capacitor and an output resistor coupled across the voltage source inverter, the voltage source inverter coupled to a corresponding phase of a three-phase power distribution system via a corresponding inductor, the three phase power distribution system providing a source voltage and a source current for each phase to a corresponding three phase load:

a source current module operative to provide a signal indicative of the value of the source current in each phase;

a source voltage module operative to provide a signal indicative of the value the source voltage in each phase;

a three-phase to stationary coordinate converter operative to convert the three-phase source current value into a source current value and to convert the three-phase source voltage value into source voltage value in stationary coordinates;

an output voltage module operative to provide a signal indicative of the output voltage across the output capacitor;

a reference voltage;

a control vector processor including;

an outer loop controller receiving the reference voltage, the output voltage, and the source voltage value, the outer loop controller configured and arranged to provide an source current reference value as a function of the difference of the square of the reference voltage and the square of the output voltage;

an adaptation processor coupled to the three phase to stationary coordinate converter module and receiving the source current therefrom, the adaptation processor operative to provide an estimate of a plurality of predetermined harmonic components of the periodic disturbance which is a function of the unknown system parameters, the source current, the source voltage, and their time derivatives in stationary coordinates;

an inner control loop controller coupled to the three phase to stationary coordinate converter module receiving the source voltage value, the source current value, and the source current reference therefrom, the inner control loop further coupled to the adaptation processor and receiving the estimate of a plurality of predetermined harmonic components of the periodic disturbance, the inner loop further coupled to the outer loop controller and receiving the source reference current therefrom, the inner loop configured and arranged to provide a first control vector that is a function of the source current, the estimate of the harmonic components of the periodic disturbance, and the source voltage;

the control vector processor further configured and arranged to provide an output control vector as a function of the first control vector and the output voltage.

2. The controller of claim 1 wherein the outer loop controller includes a lead-lag filter and an integrator receiving difference of the square of the reference voltage and the square of the output voltage, the lead-lag filter providing the source current reference.

3. The controller of claim 2 wherein the lead-lag filter plus integrator is of the form $$\frac{K_i s + b(K_i - K_p)}{s(s+b)}.$$

4. The controller of claim 1 wherein the inner loop is operative to filter the difference between the source current and the source reference current in each of plurality of estimated harmonic components and wherein the output of each of the plurality of estimated harmonic filters being summed together to form the filtered difference vector;

the inner loop controller operative to provide a proportional gain term that is the the difference between the source current and the source reference current multiplied by a predetermined constant forming a proportional gain term;

the inner loop operative to form a harmonic vector that is a function of the filtered difference vector and the proportional gain term;

the inner loop operative to form the first control vector as a function of the harmonic control vector and the source voltage.

5. The controller of claim 4 wherein the harmonic control vector is the sum of the filtered difference vector and the proportional gain term.

6. The controller of claim 4 wherein the first control vector is the sum of the proportional gain term, the filtered difference vector, and the source voltage value.

7. The controller of claim 1 wherein the inductor current module is an inductor current sensor.

8. The controller of claim 1 wherein the inductor current module is an inductor current estimator.

9. The controller of claim 1 wherein the voltage module is a voltage sensor.

10. The controller of claim 1 wherein the voltage module is a voltage estimator.

11. The controller of claim 1 wherein the output voltage module is an output voltage sensor.

12. The controller of claim 1 wherein the output voltage module is an output voltage estimator.

13. A method for controlling a three-phase voltage source inverter, the voltage source inverter having an output capacitor and an output resistor coupled across the voltage source inverter, each phase of the voltage source inverter coupled to a corresponding phase of a three-phase power distribution system via a corresponding inductor, the three phase power distribution system providing a source voltage and a source current for each phase to a corresponding three phase load, the method comprising the steps of:

determining the source voltage in each phase;

determining the source current in each phase;

converting the determined source voltage and the determined source current from a multi-phase vector into a two dimensional source voltage and source current expressed in stationary coordinates;

determining the output voltage across the output capacitor;

estimating a plurality of pre-selected harmonic components of the periodic disturbance which is a function of the unknown system parameters, the source current, the source voltage, and their time derivatives, the estimate expressed in stationary coordinates;

providing a reference voltage;

determining a source reference current;

determining a proportional gain term as a function of the source current and the source reference current;

determining a first control vector as a function of the source voltage, the proportional gain term, and the estimated harmonic components; and determining an output control vector as a function of the output voltage and the first control vector.

14. The method of claim 13 wherein the step of determining the source reference current includes determining the source reference current as a function of the output voltage, the reference voltage, and the source voltage.

15. The method of claim 13 wherein the function determining the difference between the square of the reference voltage and the square of the output voltage, filtering the difference, and multiplying the filtered difference by the source voltage.

16. The method of claim 15 wherein the filter is a lead-lag filter with an integrator.

17. The method of claim 16 wherein the lead-lag filter with an integrator is of the form $$\frac{K_i s + b(K_i - K_p)}{s(s+b)}.$$

18. The method of claim 13 wherein the step of estimating the plurality of predetermined harmonic components includes the equations $$\dot{\hat{\phi}}_k^p = \gamma_k \tilde{i}_{S\alpha\beta} - \mathcal{J}k\omega\hat{\phi}_k^p \text{ and } \dot{\hat{\phi}}_k^n = \gamma_k \tilde{i}_{S\alpha\beta} + \mathcal{J}k\omega\hat{\phi}_k^n.$$

19. The method of claim 18 wherein the step of estimating the plurality of predetermined harmonic components includes the equations $\hat{\phi}_{k,\alpha\beta} \equiv (\hat{\phi}_k^P + \hat{\phi}_k^n)$ and $$\hat{\phi}_{k,\alpha\beta} = \frac{2\gamma_k s}{s^2 + k^2\omega^2}\tilde{i}_{S\alpha\beta}.$$

20. The method of claim 13 wherein the step of determining the first control vector includes summing together the proportional gain term, the source voltage and the estimated plurality of harmonic components.

21. The method of step 13 wherein the step of determining the output control vector includes multiplying the first control vector by $2/v_c$, where $v_c$ is the determined output voltage.

* * * * *